United States Patent
Kim et al.

(10) Patent No.: US 7,681,137 B2
(45) Date of Patent: Mar. 16, 2010

(54) DISPLAY APPARATUS AND CONTROL METHOD FOR DISPLAYING USER MENU

(75) Inventors: Yun-sung Kim, Seoul (KR); Joon-hwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 11/445,304

(22) Filed: Jun. 2, 2006

(65) Prior Publication Data

US 2007/0006096 A1 Jan. 4, 2007

(30) Foreign Application Priority Data

Jun. 17, 2005 (KR) .................. 10-2005-0052612

(51) Int. Cl.
  *G06F 3/00* (2006.01)
  *G06F 9/00* (2006.01)
  *G06F 17/00* (2006.01)

(52) U.S. Cl. ............... 715/762; 715/788; 715/841; 715/828

(58) Field of Classification Search .......... 715/788, 715/810, 828, 841, 762
See application file for complete search history.

(56) References Cited

U.S. PATENT DOCUMENTS

| | | | |
|---|---|---|---|
| 5,603,034 A * | 2/1997 | Swanson ............... 717/111 |
| 5,956,035 A * | 9/1999 | Sciammarella et al. ...... 715/815 |
| 6,100,889 A * | 8/2000 | Sciammarella et al. ...... 715/815 |
| 6,686,918 B1 * | 2/2004 | Cajolet et al. ............... 345/473 |
| 2002/0060701 A1 * | 5/2002 | Naughton et al. .......... 345/853 |
| 2003/0025676 A1 * | 2/2003 | Cappendijk ................. 345/173 |
| 2003/0200505 A1 * | 10/2003 | Evans ........................ 715/507 |
| 2003/0222923 A1 * | 12/2003 | Li ............................. 345/815 |
| 2004/0001092 A1 * | 1/2004 | Rothwein et al. ........... 345/763 |
| 2004/0148591 A1 * | 7/2004 | Kumhyr et al. ............ 717/137 |
| 2005/0021494 A1 * | 1/2005 | Wilkinson .................... 707/1 |

FOREIGN PATENT DOCUMENTS

| | | |
|---|---|---|
| JP | 63-148377 A | 6/1988 |
| JP | 2000-089877 A | 3/2000 |
| JP | 2000-116955 A | 4/2000 |

\* cited by examiner

*Primary Examiner*—Tadesse Hailu
*Assistant Examiner*—Anita D Chaudhuri
(74) *Attorney, Agent, or Firm*—Sughrue Mion, PLLC

(57) ABSTRACT

A display apparatus and a control method are provided in which a size menu item is changed, when the menu item is directed by a user. A display apparatus includes a user input part; a menu generator generating a user menu including at least one or more items; a display part displayed with the user menu generated from the menu generator; and a controller controlling the menu generator so that a size of a directed item according to an operation of the user input part among the items of the user menu displayed at the display part is reduced into a predetermined size and then is returned to an original size.

16 Claims, 8 Drawing Sheets

FIG. 3
(a)  —100
(b) 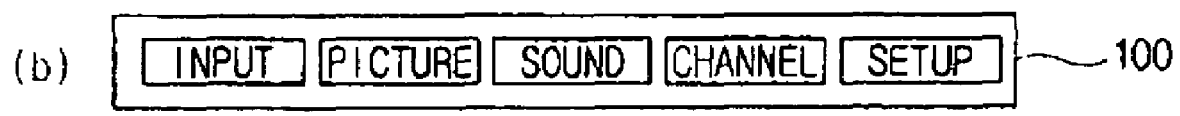 —100

DISPLAY APPARATUS AND CONTROL METHOD FOR DISPLAYING USER MENU

CROSS-REFERENCE TO RELATED APPLICATIONS

This application claims priority from Korean Patent Application No. 10-2005-0052612, filed on Jun. 17, 2005, in the Korean Intellectual Property Office, the disclosure of which is incorporated herein by reference.

BACKGROUND OF INVENTION

1. Field of Invention

The present invention relates to a display apparatus and a control method thereof, and more particularly, to a display apparatus and a control method thereof for displaying a user menu.

2. Description of the Related Art

Conventionally, a display apparatus includes a display part which displays a video and may be a television, a monitor, Personal Digital Assistant (PDA), a cellular phone and the like.

Such a display apparatus displays a user menu, including items for performing various functions, on the display part.

For example, the display apparatus displays the user menu for controlling a condition of the display apparatus through On Screen Display (OSD). Therefore, a user can control the condition of the display apparatus by directing and selecting the items included in the user menu, while watching the user menu.

When a user directs any one among various items while watching the user menu displayed at the display part, there should be a difference between the directed item and other items visually so that the user can recognize correctly what is the directed item.

If there is no difference between the directed item and the other items, the user cannot properly select the item, thereby causing confusion.

Therefore, if a size of the directed item is changed so as to be distinguished visually from the other items, the user can recognize correctly the position of the directed item.

SUMMARY OF THE INVENTION

It is an aspect of the present invention to provide to a display apparatus and a control method thereof in which a size of a directed menu item is changed, when the menu item is directed by a user.

According to an aspect of the present invention, there is provided a display apparatus, comprising: a user input part; a menu generator generating a user menu including at least one or more items; a display part displaying the user menu; and a controller controlling the menu generator so that a size of a directed item according to an operation of the user input part among the items of the user menu displayed at the display part is reduced into a predetermined size and then is returned to an original size.

According to an aspect of the present invention, the controller controls the menu generator so that an outline size of the directed item is reduced at the same rate in an inside direction and then is returned to the original size.

According to an aspect of the present invention, the controller controls the menu generator to allow a position of the items to be changed, when the size of the directed item is reduced into a predetermined size so that each distance between the directed item and the adjacent items is uniformly maintained.

According to an aspect of the present invention, the controller controls the menu generator so that after the size of the directed item is reduced into a predetermined size and is returned to the original size, the directed item is enlarged to a predetermined size and then is returned to the original size.

According to an aspect of the present invention, the controller controls the menu generator so as to display a user sub-menu including at least one or more sub-items corresponding to the selected item, when the directed item is selected by the operation of the user input part.

According to an aspect of the present invention, the controller controls the menu generator so that a size of the directed sub-item is reduced into a predetermined size and then is returned to the original size, when one sub-item among the sub-items of the user sub-menu is selected on the user sub-menu by the operation of the user input part.

According to an aspect of the present invention, the controller executes a function according to the selected sub-item, when the directed sub-item is selected by the operation of the user input part.

According to an aspect of the present invention, it takes less a second to reduce the size of the directed item into a predetermined size and return it to the original size.

According to an aspect of the present invention, the controller controls the menu generator so that after the item directed by the operation of the user input part is moved to a stationary position of the display part, and the size of the directed item is reduced into a predetermined size and then is returned to the original size.

Another aspect of the present invention includes a control method of a display apparatus comprising a user input part and a display part wherein said display part displays a user menu including at least one or more items by an operation of the user input part; and controlling a size of the item directed by the operation of the user input part among the items of the user menu to reduce into a predetermined size and then return to an original size.

According to an aspect of the present invention, the controller controls an outline size of the directed item to be reduced at the same rate in an inside direction and then to be returned to the original size.

The control method of the display apparatus further comprises changing positions of the items to uniformly maintain distances between the directed item and the adjacent items, when the size of the directed item is reduced.

The control method of the display apparatus further comprises controlling the directed item to be reduced into a predetermined size and then to be returned to the original size and thereafter, to be enlarged into a predetermined size and then to be returned to the original size.

The control method of the display apparatus further comprises controlling a user sub-menu including at least one or more sub-items corresponding to the selected item to be displayed, when the directed item is selected by the operation of the user input part.

The control method of the display apparatus further comprises controlling the sub-item to be reduced into a predetermined size and then to be returned to the original size, when one sub-item among the sub-items is directed by the operation of the user input part.

The control method of the display apparatus further comprises executing a function according to the selected sub-item, if one sub-item of the sub-items is selected by the operation of the user input part.

According to an aspect of the present invention, it takes less a second to reduce the size of the directed item into a predetermined size and then return it to the original size.

The control method of the display apparatus further comprises moving the item directed by the operation of the user input part to a stationary position of the display part; and controlling the size of the directed item to be reduced into a predetermined size and then to be returned to the original size, after the directed item is moved to the stationary position of the display part.

BRIEF DESCRIPTION OF THE DRAWINGS

The above and/or other aspects of the prevent invention will become more apparent by describing in detail exemplary embodiments thereof, with reference to the accompanying drawings, in which:

FIGS. 3A, 3B, 4A, 4A and 4B illustrate that a size of each item of the user menu displayed in FIG. 2 is changed according to a control of a controller of FIG. 1;

DETAILED DESCRIPTION OF EXEMPLARY EMBODIMENTS OF THE INVENTION

Figure 1:
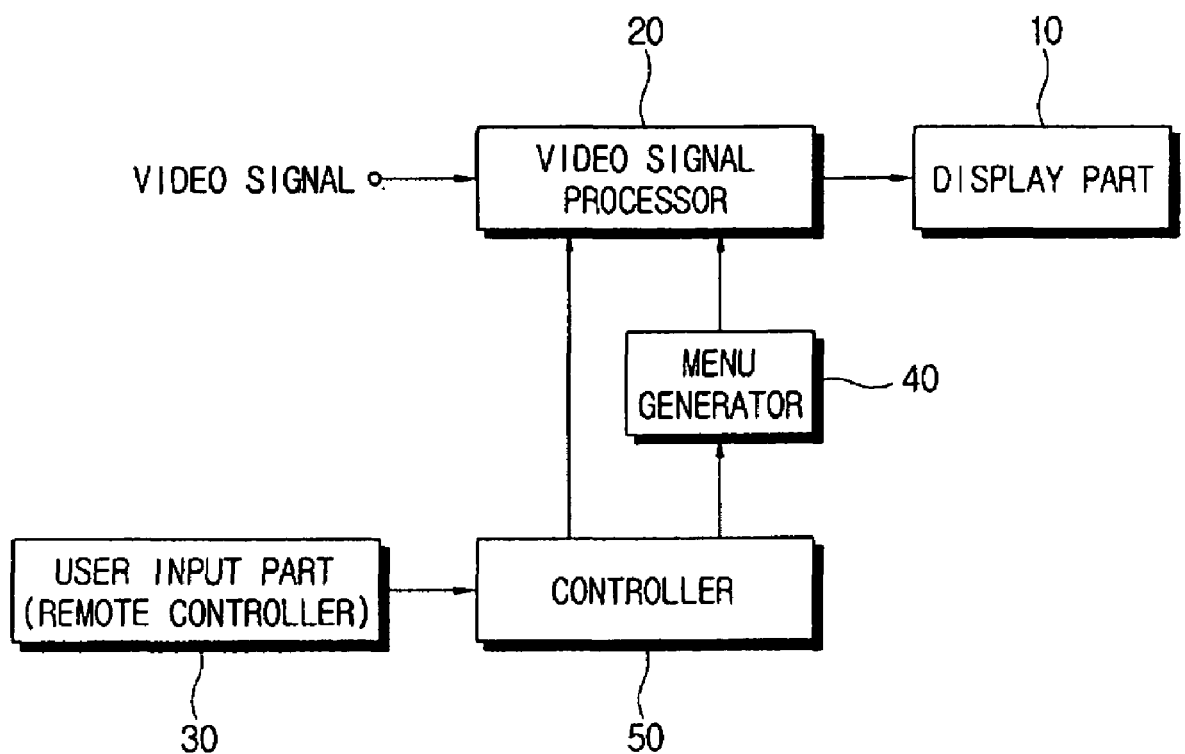
FIG. 1 is a control block diagram of a display apparatus consistent with a first exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

As shown in FIG. 1, a display apparatus according to a first exemplary embodiment of the present invention includes a display part 10, a video signal processor 20, a user input part 30, a menu generator 40, and a controller 50.

The display part 10 receives a video signal from the video signal processor 20 to display a video. The display part 10 includes a panel displayed with the video, and a panel driving part processing the video signal input from the video signal processor 20 to be displayed with the video in the panel.

The video signal processor 20 receives the video signal to be input and a menu signal to be output from the menu generator 40, and overlaps the video signal and the menu signal to output to the display part 10.

Herein, the menu generator 40 may be provided as a function of the video signal processor 20 and be integrally formed with the video signal processor 20 as a single chip.

The user input part 30 outputs a key signal to the controller 50 according to an operation of the user, and may be provided as a remote controller 30, a mouse, a key board, a touch pen and the like. In below, the user input part 30 is explained as the remote controller 30.

The remote controller 30 includes a key button for performing a various function, and a key signal generator generating a key signal corresponding to the operation of the key button.

When the user operates the key button, the key signal generator generates the key signal corresponding to the key button, and the controller 50 receiving the key signal generated from the key signal generator controls the menu generator 40 and the video signal processor 20 and the like to correspond to the key signal.

The menu generator 40 generates a user menu 100 including at least one or more items and/or a user sub-menu 110 corresponding to each item. A menu signal corresponding to the user menu 100 and/or the user sub-menu 110 output from the menu generator 40 is overlapped with the video signal at the video signal processor 20.

The controller 50 controls the menu generator 40 so that the directed item according to the key button operation of the remote controller 30 among the items of the user menu 100 which is displayed at the display part 10 is reduced into a predetermined size, and then is returned to an original size.

The controller 50 will be described with reference to FIGS. 2 through 4 for explaining as a first exemplary embodiment that a menu key, a left (+)/right (−) key, a selection key, and a conclusion key are provided in the remote controller 30.

Figure 2:
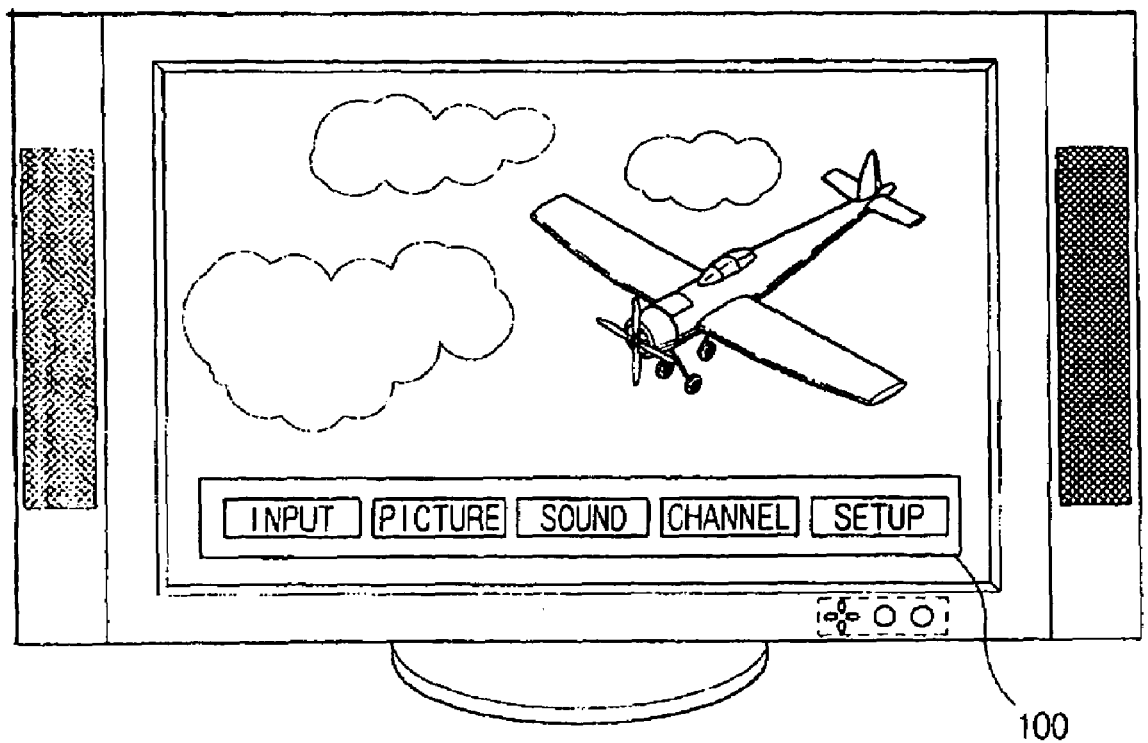
FIG. 2 illustrates that a user menu generated by a menu generator of FIG. 1 is displayed.

When the user pushes the menu key of the remote controller 30, the controller 50 controls the menu generator 40 to generate the user menu 100 including a plurality of items as shown in FIG. 2.

At this time, the user menu 100 displayed at the display part 10 may be displayed in a horizontal or vertical direction, and also in a random position of a upper, a middle, a lower, a left, and a right and the like of the display part 10.

Meanwhile, when the user operates the left (+)/right (−) key of the remote controller 30 and directs each item included in the user menu 100, the controller 50 controls the menu generator 40 so that a size of the directed item is reduced into a predetermined size, and then is returned to an original size.

For example, if the user operates the right (+) key once, the size of a directed first item, e.g., "INPUT," is reduced into a predetermined size as shown in (a) of FIG. 3, and then is returned to the original size as shown in (b) of FIG. 3. Herein, it may take a time for less a second to reduce the "INPUT" item into a predetermined size and then to return it to the original size.

At this time, the controller 50 controls the menu generator 40 so that an outline size of the directed item is reduced at the same rate in an inside direction and then is returned to the original size. The controller 50 controls the menu generator 40 so as to reduce the size of display contents in the outline as well as the outline size of the directed item, and/or to reduce only the outline size without changing the size of the display contents in the outline. Further, when the outline of the items is a rectangle, the controller 50 reduces the size of only one direction of the horizontal and/or vertical direction. The reduction of the outline size of the item may be provided in various manners.

Figure 4:
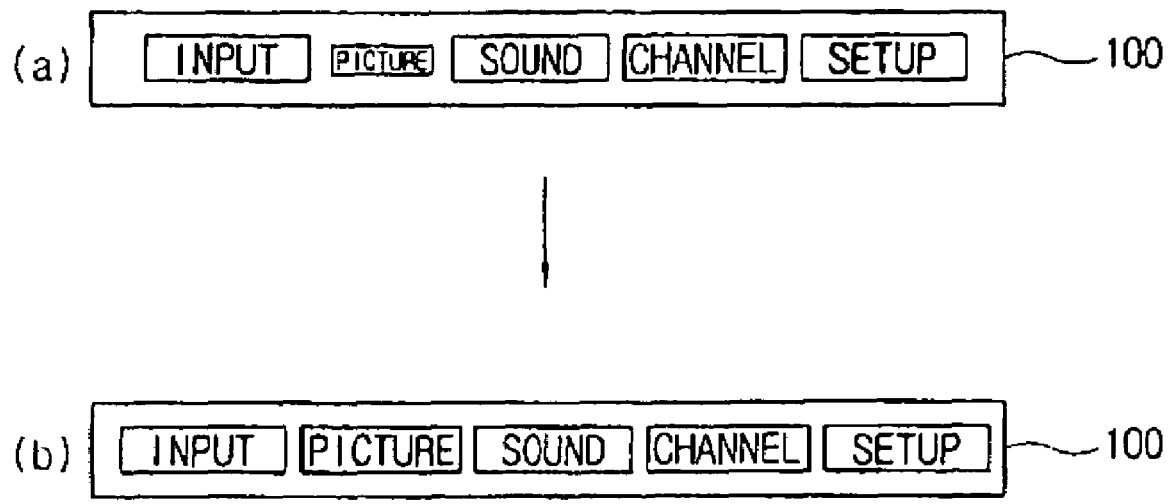

Further, if the user operates the right (+) key of the remote controller 30 once more, as shown in (a) of FIG. 4, the size of a second item, e.g., "PICTURE," is reduced into a predetermined size and then is returned to the original size, as shown in (b) of FIG. 4.

Herein, the controller 50 controls the menu generator 40 so that each distance between the directed item and the displayed items is uniformly maintained to allow a display position of the items, except the directed item, to be changed, when the directed item size is reduced into a predetermined size or is returned to the original size. Accordingly, while the size of the directed item is changed, the positions of the displayed items, except the directed item, are changed together, so that the dynamic visible image is presented to the user.

Figure 5:
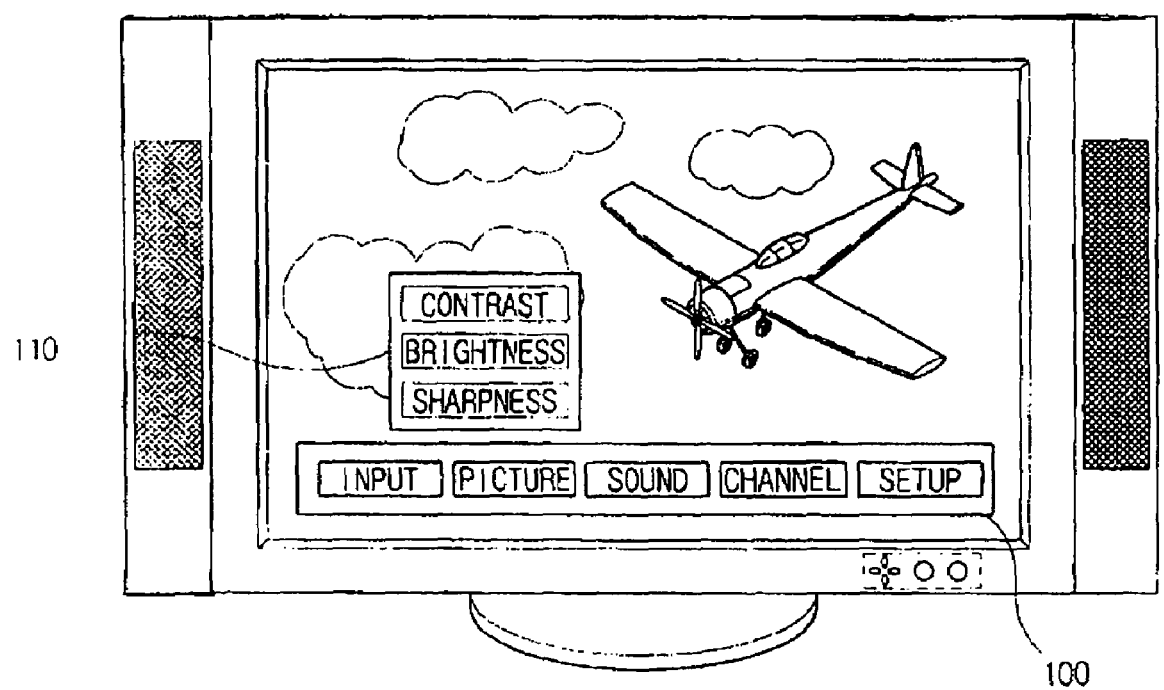
FIG. 5 illustrates that a user sub-menu generated by the menu generator of FIG. 1 is displayed.

Meanwhile, the controller 50 controls the menu generator 40 to display the user sub-menu 110 corresponding to the selected item, as shown in FIG. 5, when the directed item is selected by the selection key of the remote controller 30. Herein, the user sub-menu 110 may comprise at least one or more sub-items.

The user sub-menu 110, as shown in FIG. 5, may be displayed near the selected item along with the user menu 100, and/or only the user sub-menu 110 may be displayed without displaying the user menu 100.

At this time, the user operates the upper (−)/lower (+) key to designate one sub-item among the sub-items included in the user sub-menu 110. The controller 50 controls the menu generator 40 so that the directed sub-item, in the same manner of the item of the user menu 100, is reduced into a predetermined size and then is returned to the original size.

Herein, the upper (−)/lower (+) key may be combined with the left (−)/right (+) key for designating the item of the user menu 100. That is, the same key button may have different functions corresponding to the case that the item of the user menu 100 is designated or the sub-item of the sub-user menu 110 is designated.

Figure 6:
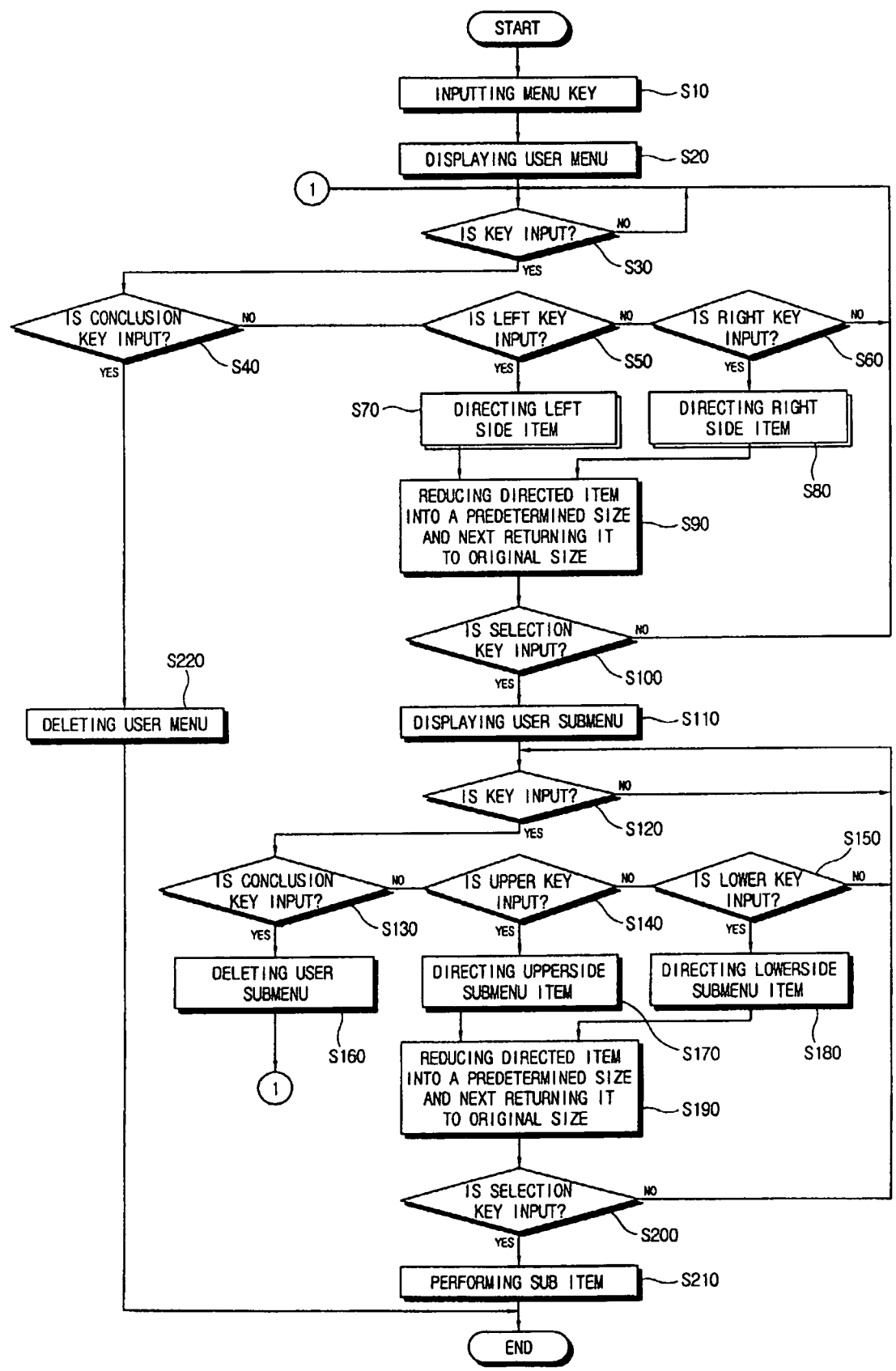
FIG. 6 is a view of a control flow of the display apparatus consistent with the first exemplary embodiment of the present invention.

A control process of a display apparatus according to a first exemplary embodiment of the present invention will be described with reference to FIG. 6.

At operation S10, when a user pushes a menu key of a remote controller 30, at operation S20, a menu generator 40 displays a user menu 100 to a display part according to control of a controller 50. At operation S30, when a key signal from the remote controller 30 is sensed after the user menu 100 is displayed to the display part 10, at operation S40, the controller 50 determines that the sensed key signal is the key signal corresponding to a conclusion key.

At operation S220, when the key signal sensed by the controller 50 is determined to be the key signal corresponding to the conclusion key, the menu generator 40 deletes the user menu 100 displayed to the display part 10.

At operations S70, S80, when the key signal sensed by the controller 50 is determined to be the key signal corresponding to a left (−) key or a right (+) key, the menu generator 40 directs respectively a left item or a right item from a predetermined standard item among the items included in the user menu 100. At this time, at operation S90, the directed item is reduced into a predetermined size and then is returned to the original size.

At operation S100, if the user pushes the selection key after any item is directed, at operation S110, the menu generator 40 displays a user sub-menu 110 corresponding to the selected item to the display part 10 according to the control of the controller 50.

At operation S130, if the user pushes the key of the remote controller 30 after the user sub-menu 110 is displayed to the display part 10, the controller 50 determines that an input key signal is the key signal corresponding to the conclusion key. At operation S160, when the key signal sensed by the controller 50 is determined to be the key signal corresponding to the conclusion key, the menu generator 40 deletes the user sub-menu 110 displayed at the display part 10. At operations S170, S180, when the key signal sensed by the controller 50 is determined to be the key signal corresponding to an upper (−) key or a the lower (+) key, the menu generator 40 directs respectively an upper side sub-item or a lower side sub-item from a predetermined standard item among the sub-items included in the user sub-menu 110. At this time, at operation S190, the directed sub-item is reduced into a predetermined size and then is returned to the original size.

At operation S200, if the user pushes the selection key after any sub-item is directed, at operation S210, the controller 50 executes a function corresponding to the selected sub-item.

Meanwhile, a control process of a display apparatus according to a second exemplary embodiment of the present invention will be described with reference to FIG. 7.

Figure 7:
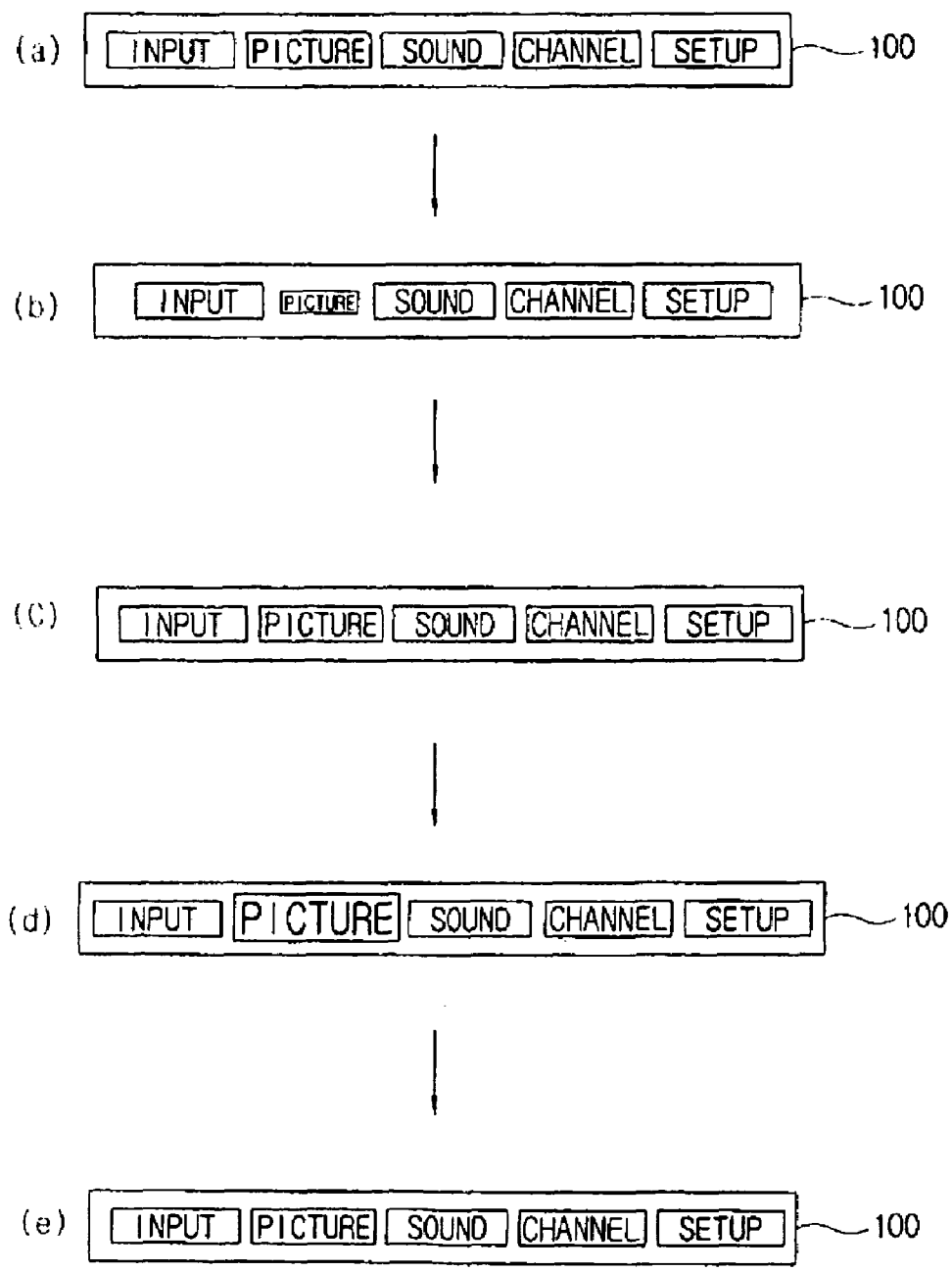
FIG. 7 is a view of a control process of a display apparatus consistent with a second exemplary embodiment of the present invention.

As shown in (a) of FIG. 7, when a key signal for directing one item among a plurality of items is input from a remote controller 30 in a state that a user menu 100 including the plurality of items is displayed to a display part 10, a controller 50 controls a menu generator 40 so that the directed item is reduced into a predetermined size as shown in (b) of FIG. 7 and thereafter, the directed item is returned to the original size as shown in (c) of FIG. 7, and is enlarged to a predetermined size as shown in (d) of FIG. 7 and then is returned to the original size as shown in (e) of FIG. 7.

Accordingly, the user may correctly recognize the directed item.

If the process where after the directed item is reduced into a predetermined size and then is returned to the original size, the directed item is enlarged to a predetermined size and then is returned to the original size is set as a cycle, the controller 50 controls the menu generator 40 so that the directed item has continuously several cycle.

Meanwhile, a control process of a display apparatus according to a third exemplary embodiment of the present invention will be described with reference to FIG. 8.

Figure 8:
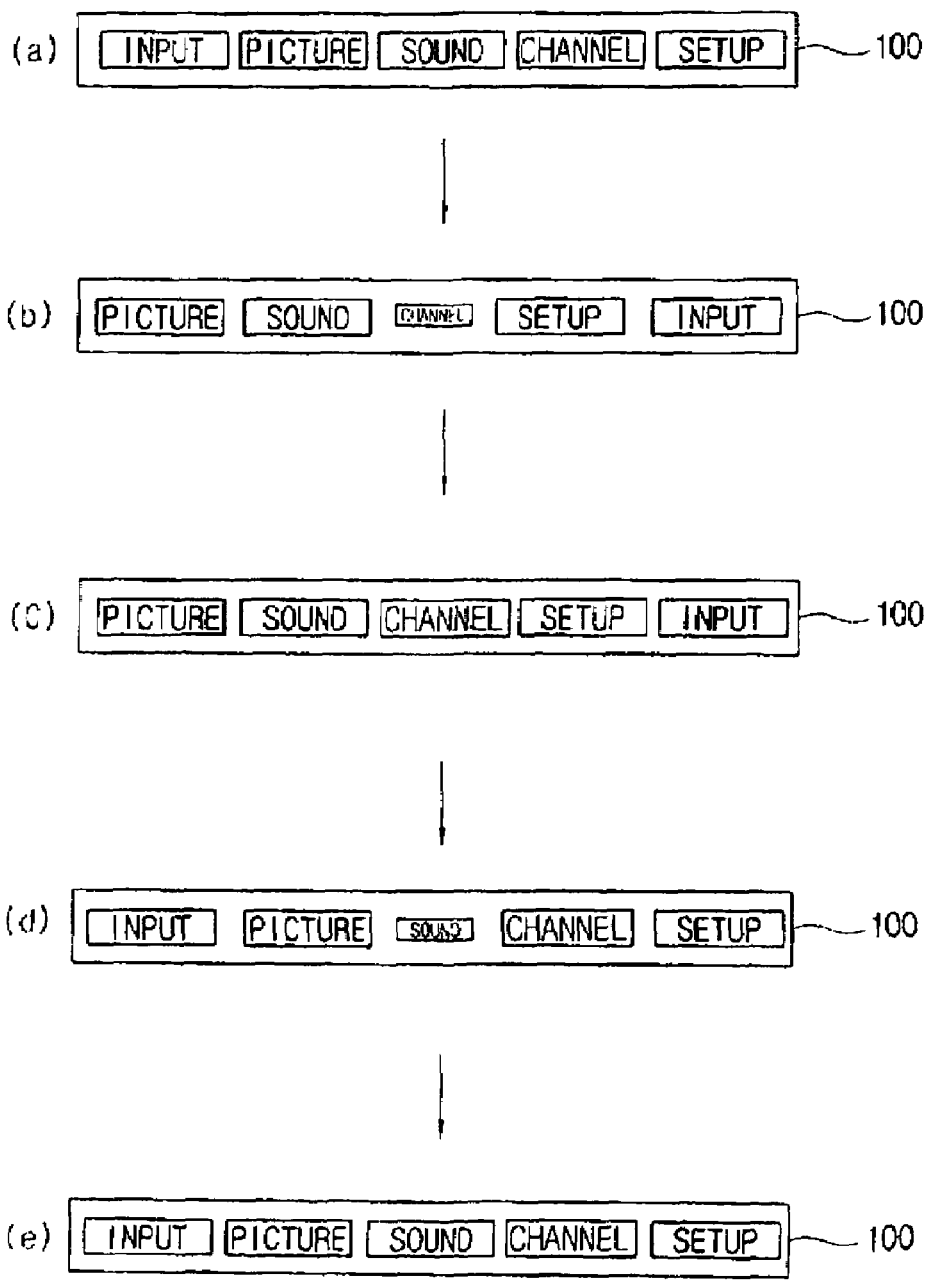
FIG. 8 is a view of a control process of a display apparatus consistent with a third exemplary embodiment of the present invention.

As shown in (a) of FIG. 8, when a key signal for directing one item among a plurality of items is input from a remote controller 30 in a state that a user menu 100 including the plurality of items is displayed to a display part 10, a controller 50 controls a menu generator 40 so that after the directed item is moved to a stationary position of the display part 10, the direct item is reduced into a predetermined size and then is returned to the original size.

For example, when the stationary position of the display part 10 is the position of a third item, e.g., "SOUND," among a plurality of items shown in (a) of FIG. 8, and the user pushes a right (+) key of the remote controller 30 so that the controller 50 controls the menu generator 40 such that after all items displayed at the display part 10 are moved by one unit in a left direction to allow a fourth item, e.g., "CHANNEL," to be placed in the third position, the "CHANNEL" item is reduced into a predetermined size as shown in (b) of FIG. 8 and then is returned to the original size as shown in (c) of FIG. 8. Herein, an "INPUT" item provided at the left-most side is moved to the right-most side.

And then, as shown in (c) of FIG. 8, if the user pushes a left (−) key, the controller 50 controls the menu generator 40 so that after all items displayed to the display part 10 are moved by one unit in a right direction to allow a second item, e.g., "SOUND," to be placed in the third position, and then the "SOUND" item is reduced into a predetermined size as shown in (d) of FIG. 8 and then is returned to the original size as shown in (e) of FIG. 8. Herein, the "INPUT" item provided at the right most side is moved to the left-most side.

Accordingly, the user may correctly recognize the directed item or the selected item because the directed or selected item is always placed at the stationary position of the display part 10.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus, comprising:
   a user input part;
   a menu generator which generates a user menu including a plurality of items;
   a display part which displays the user menu; and
   a controller which controls the menu generator so that a size of an item directed according to an operation of the user input part among the plurality of items of the user menu displayed at the display part is reduced to a predetermined size and then returned to an original size from the predetermined size while the item is still directed by the operation of the user input part,
   wherein the controller controls the menu generator so that after the size of the directed item is reduced to the predetermined size and then returned to the original size, the directed item is enlarged to another predetermined size and then returned to the original size while the item is still directed by the operation of the user input part, and
   the controller controls the menu generator so that the size of the directed item is reduced to the predetermined size, and then returned to the original size and then enlarged to the another predetermined size and then again returned to the original size without an operation of the user input part directing an item different from the directed item.

2. The display apparatus according to claim 1, wherein the controller controls the menu generator so that an outline size of the directed item is reduced at a same rate in an inside direction and then returned to the original size.

3. The display apparatus according to claim 2, wherein the controller controls the menu generator so as to change a position of the items, if the size of the directed item is reduced to the predetermined size, so that distances between the directed item and the adjacent items is uniformly maintained.

4. The display apparatus according to claim 1, wherein the controller controls the menu generator to display a user sub-menu including at least one sub-item corresponding to the selected item, if the directed item is selected by the operation of the user input part.

5. The display apparatus according to claim 4, wherein the controller controls the menu generator so that the size of the directed sub-item is reduced to the predetermined size and then returned to the original size, if one sub-item among a plurality of sub-items of the user sub-menu is selected by the operation of the user input part.

6. The display apparatus according to claim 5, wherein the controller executes a function according to the selected sub-item, if the directed sub-item is selected by the operation of the user input part.

7. The display apparatus according to claim 1, wherein reducing the size of the directed item to the predetermined size and then returning the size of the directed item to the original size takes a time for less than a second.

8. The display apparatus according to claim 1, wherein the controller controls the menu generator so that after the item directed by the operation of the user input part is moved to a stationary position of the display part, and the size of the directed item is reduced into the predetermined size and then returned to the original size.

9. A control method of a display apparatus comprising a user input part and a display part, the method comprising:
   displaying a user menu including a plurality of items on the display part by an operation of the user input part; and
   controlling a size of an item directed by the operation of the user input part among the plurality of items of the user menu to be reduced to a predetermined size and then returned to an original size from the predetermined size while the item is still directed by the operation of the user input part,
   wherein the controlling further comprises controlling the size of the directed item to be enlarged to another predetermined size and then returned to the original size, after the size of the directed item is reduced to the predetermined size and then returned to the original size while the item is still directed by the operation of the user input part, and
   the controlling the size of the directed item to be reduced to the predetermined size, and then returned to the original size and then enlarged to the another predetermined size and then again returned to the original size is performed without an operation of the user input paint directing an item different from the directed item.

10. The control method of the display apparatus according to claim 9, wherein the controlling controls an outline size of the directed item to be reduced at a same rate in an inside direction and then returned to the original size.

11. The control method of the display apparatus according to claim 9, further comprising changing positions of the items to uniformly maintain distances between the directed item and adjacent items, if the size of the directed item is reduced.

12. The control method of the display apparatus according to claim 9, further comprising controlling a user sub-menu including at least one sub-item corresponding to the selected item to be displayed, if the directed item is selected by the operation of the user input part.

13. The control method of the display apparatus according to claim 9, further comprising controlling the sub-item to be reduced to a predetermined size and then returned to the original size, if one sub-item among a plurality of sub-items is directed by the operation of the user input part.

14. The control method of the display apparatus according to claim 13, further comprising executing a function according to the selected sub-item, if one sub-item of the sub-items is selected by the operation of the user input part.

15. The control method of the display apparatus according to claim 14, wherein reducing the size of the directed item to the predetermined size and then returning the size of the directed item to the original size takes a time for less than one second.

16. The control method of the display apparatus according to claim 9, further comprising:
   moving the item directed by the operation of the user input part to a stationary position of the display part; and
   controlling the size of the directed item to be reduced to the predetermined size and then returned to the original size, after the directed item is moved to the stationary position of the display part.

* * * * *